Figure 1:
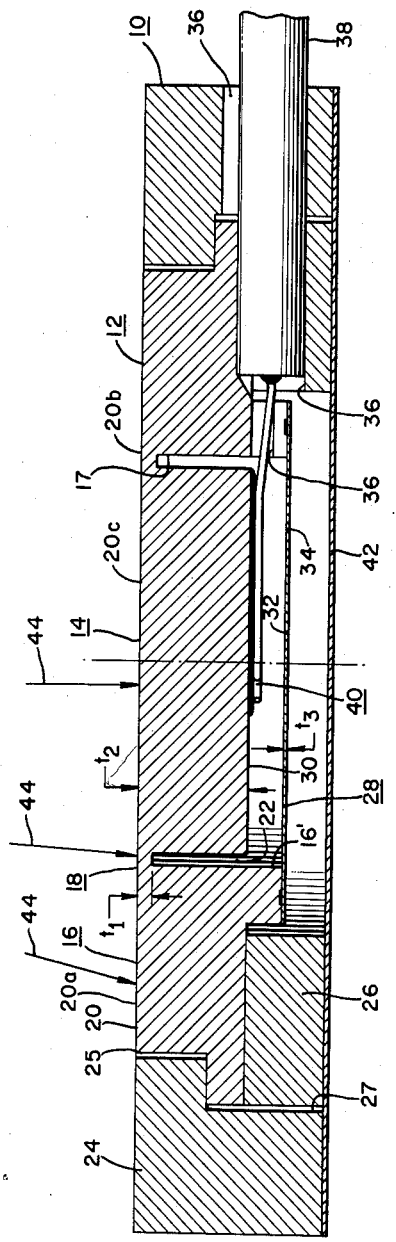

April 30, 1963 — R. P. CLIFFORD ETAL — 3,088,072
ELECTROMAGNETIC RADIATION INTENSITY
MEASUREMENT ARRANGEMENT
Filed July 28, 1961

RICHARD P. CLIFFORD
ALPHONSO AMBROSIO
INVENTORS.

BY
AGENTS.

United States Patent Office 3,088,072
Patented Apr. 30, 1963

3,088,072
ELECTROMAGNETIC RADIATION INTENSITY MEASUREMENT ARRANGEMENT
Richard P. Clifford, Tarzana, and Alphonso Ambrosio, Los Angeles, Calif., assignors to Space Technology Laboratories, Inc., Los Angeles, Calif., a corporation of Delaware
Filed July 28, 1961, Ser. No. 127,542
10 Claims. (Cl. 325—364)

This invention relates to the electromagnetic radiation energy measuring art and more particularly to new and improved methods of and arrangements for increasing the accuracy and sensitivity of calorimeter type electromagnetic radiation energy measuring devices.

Electromagnetic radiation energy measuring arrangements are known in which a receiving element, that is sensitive to a wide range of electromagnetic radiation wave lengths, is exposed to such radiation and in response thereto exhibits an increase in temperature. A measurement of the temperature of the element thus provides an indirect measurement of the intensity of the electromagnetic radiation. In such arrangements it is necessary that the heat transfer from the element to its supporting members be kept to a minimum and, preferably, such losses that do exist should be kept substantially constant. In addition, radiative and convective losses from the element must also be kept to a minimum to provide accurate radiation intensity measurement.

Electromagnetic radiation intensity measurement devices utilized in the past have not always proven completely satisfactory in all these respects. More specifically, the heat transfer from the element to the supporting members has tended to be not only unacceptably high but also variable because of variations in mechanical fit therebetween. Also, radiative and convective losses have, under some certain circumstances, become excessive.

Accordingly, it is an object of this invention to provide an improved electromagnetic radiation intensity measurement arrangement.

It is a further object of this invention to provide such an arrangement wherein heat transfer losses from the radiation receiving element are minimized.

It is yet another object of this invention to provide such an arrangement in which conductive heat losses to support members are minimized.

The above and other objects are realized, in accordance with the principles of this invention, by providing in one embodiment, an electromagnetic radiation absorbing element and a guard ring of unitary construction. The guard ring is coupled in close proximity to the radiation receiving element by a comparatively thin flange, the cross sectional area of which is selected as the minimum value necessary for structural support of the element to the guard ring. The radiation absorbing surface of the element and of the flange and of the guard ring are substantially coplanar and have a surface finish that provides a high electromagnetic radiation absorptivity characteristic.

Support members are coupled to the guard ring to provide structural rigidity and these support members are preferably made of a thermally insulating material. An aperture is provided through the support members to provide access for a thermocouple or other temperature measuring device to the bottom surface of the radiation receiving element.

Since the guard ring receives the same electromagnetic radiation flux as the receiver element, its temperature approaches that of the receiver element thereby minimizing radiative heat transfer therebetween. There will, unavoidably, be some conductive heat transfer from the guard ring to the support members but conductive heat transfer from the receiver element to the guard ring to make up this loss is minimized by the thin cross sectional area of the flange. Further, convective heat transfer losses are minimized by the close proximity of the guard ring to the receiver element.

A shield means is coupled to the guard ring and is substantially parallel to and spaced apart from the bottom surface of the radiation receiving element. An upper surface of the shield means that is facing the bottom surface of the radiation receiving element has a surface finish that provides a high electromagnetic radiation absorptivity characteristic to receive electromagnetic radiation emitted from the bottom surface of the receiver element. The bottom surface of the shield means has a surface finish that provides a low electromagnetic radiation absorptivity and, consequently, a low emissivity. Thus, the temperature of the shield means increases to approach the temperature of the receiver element and thereby minimizes radiative heat losses therefrom.

Figure 2:
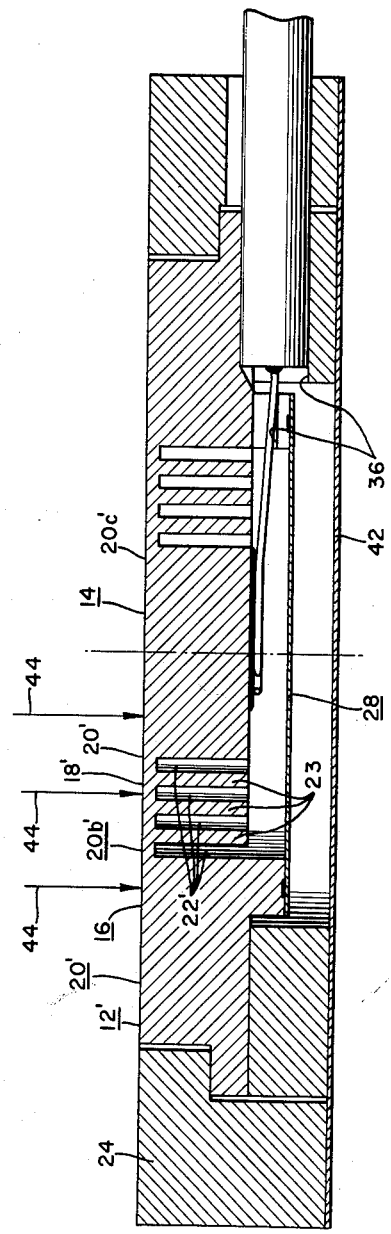

This invention is described in greater detail in the following specification taken together with the appended drawing wherein similar reference characters refer to similar elements throughout and in which:

FIG. 1 is a cross sectional view of one embodiment of an electromagnetic radiation intensity measuring arrangement according to applicants' invention; and FIG. 2 is a cross sectional view of another embodiment of applicants' invention.

Referring now to FIG. 1, there is shown an electromagnetic radiation intensity measurement device, generally designated 10, according to the principles of applicants' invention. A unitary body member 12 is comprised of an electromagnetic radiation receiving element 14, a guard ring 16, and a flange 18. An upper surface 20 of the body member 12 has a surface finish that provides a high electromagnetic radiation absorptivity coating. It is desired that the surface 20 be substantially a black body. Many well known methods may be employed to achieve this condition; for example, the surface 20 may have a surface roughness on the order of 160 microinches and a black oxide coating deposited thereon. In a preferred embodiment of this invention, as illustrated on FIG. 1, an upper surface 20a of the guard ring 16 and upper surface 20b of the flange 18 and upper surface 20c of the receiver element 14 are substantially coplanar.

The thickness of the flange 18, indicated on FIG. 1 by the dimension $t_1$ is selected to be the minimum necessary for structural support of the receiver 14 with the guard ring 12. In the preferred embodiment of this invention the thickness $t_1$ of the flange 18 is on the order of 10% of the thickness $t_2$ of the receiver element 14.

The body member 12 may be fabricated of any heat responsive material. However, it will be appreciated that the lower the specific heat of the body member 12 the faster will be the response of the receiver 14 to changes in electromagnetic radiation environment. Thus the body member 12 may be fabricated from stainless steel, copper, or the like.

An air gap 22 is provided between the receiver 14 and the guard ring 16 and this air gap is maintained comparatively small to minimize convective heat transfer therebetween.

A first support member 24 and a second support member 26 are provided at an outer periphery of the guard ring 16 to provide structural rigidity to the assembly and thermal insulation to the guard ring 16. Thus, the support members 24 and 26 may be fabricated, for example, of a ceramic or other structural thermally insulating material. The area of contact between the body member 12 and the support members 24 and 26 is preferably maintained at a minimum value to reduce conductive heat transfer therebetween. Thus, a narrow continuous flange or a few support legs may be utilized. Air gaps 25 and 27 are provided between support 24 and the guard ring 16 and between support 26 and support 24, respectively. These air gaps 25 and 27 are also maintained small to minimize convective heat transfer losses from the guard ring 16.

A shield means 28 is coupled to a shoulder 16' of the guard ring 16 and is substantially parallel to and spaced apart in close proximity from a bottom surface 30 of the receiver element 14. The shield means 28 is substantially coextensive with the bottom surface 30 of the receiver element 14. An upper surface 32 of the shield means 28 has a surface finish that provides a high electromagnetic radiation absorptivity characteristic similar to that described above for the surface 20. A bottom surface 34 of the diaphragm 28 has a surface finish that provides a low electromagnetic radiation absorptivity characteristic and, consequently, a low electromagnetic radiation emissivity characteristic. This low emissivity surface 34 may easily be provided by polishing the surface 34 or electroplating with a shiny material, such as silver or the like. The shield means 28 may be fabricated of a thermally responsive material and, preferably, the shield means 28 has a thermal capacity less than the receiver element 14. Thus the shield means 28 may be fabricated of copper sheet having a thickness $t_3$ on the order of 5% of the thickness $t_2$ of the receiver 14.

Apertures 36 are provided in the first and second support members 24 and 26 and the shoulder 16' of the guard ring 16 to permit insertion of a heat sensitive member responsive to temperature changes, such as a thermocouple 38 to measure the temperature of the receiver element 14. The thermocouple 38 has a bead 40 coupled to the rear surface 30 of the receiver 14 substantially in the center thereof. The thermocouple 38 may be of the iron-constantan type or fabricated of other well known thermocouple materials and the measurement of the temperature of the receiver element 14 provides a measure of the electromagnetic radiation flux incident on the surface 20. A closure disc 42 is provided spaced apart from and substantially parallel to the shield means 28 and is coupled to the support members 24 and 26 to effect a seal thereon.

In operation, electromagnetic radiation, illustrated schematically on FIG. 1 by the arrows 44, is incident on the surface 20 and, since the surface 20a of the guard ring 16, the surface 20b of the flange 18, and the surface 20c of the receiver element 14 are substantially coplanar, the incident flux from the electromagnetic radiation 44 is substantially constant throughout the surface 20 of the body member 12. Thus the receiver 14, flange means 18 and the guard ring 16 tend to increase responsively in temperature at the same rate and their temperatures will be substantially the same. However, the guard ring 16 is coupled to the supports 24 and 26 and there is a small unavoidable heat transfer from the guard ring 16 to the supports 24 and 26 which tends to lower the temperature of the guard ring 16 below that of the receiver 14.

Conduction between the receiver 14 and the guard ring 16 is minimized by providing, as the only coupling therebetween, the comparatively thin flange 18. Thus the net heat flow by conduction from the receiver 14 to the guard ring 16 is substantially minimized. Heat losses from the guard ring 16 to the supports 24 and 26 tend to establish a thermal gradient across the guard ring 16 and the thin flange means 18 tends to maintain the surfaces 17 of the guard ring 16 that are in proximity to the receiver element 14 at substantially the same temperature as the receiver element 14. Since the receiver 14 and the surfaces 17 of the guard ring 16 are at substantially the same temperature, radiative heat transfer across the air gap 22 is minimized and the small size of the air gap 22 also minimizes convective heat transfer therebetween.

The shield means 28 receives heat by radiation from the bottom surface 30 of the receiver 14 and receives heat by conduction from the shoulder 16' of the guard ring 16. Since the upper surface 32 of the shield means 28 has a high absorptivity, the temperature of the shield means 28 rapidly approaches the temperature of the receiver element 14. In the preferred embodiment of this invention the shield means 28 has a thermal capacity that is small compared to the thermal capacity of the receiver element 14 thereby not introducing a significant response lag. Radiative heat loss from the shield means 28 is minimized since the bottom surface 34 exhibits a comparatively low emissivity.

Thus, heat losses from the receiver element 14 are minimized and the temperature measured by the thermocouple 38 allows an accurate calculation of the incident electromagnetic radiation flux.

Applicants have fabricated electromagnetic radiation intensity measuring devices substantially in accordance with the embodiment shown on FIG. 1 and while the following specifications will be helpful in enabling one skilled in the art to practice this invention, it is to be understood that these are not considered to be limitations thereof and represent only one embodiment of applicants' invention. The body member 12 has a diameter across its surface 20 of approximately .600 inch. The diameter of the receiver element 14 is approximately .30 inch, and the air gap 22 approximately .010 inch. The thickness of the receiver element 14 is approximately .060 inch and the thickness of the flange 18 is approximately .007 inch. The body member 12 is fabricated of type 321 stainless steel and the shield means 28 is .003 copper sheet and is spot welded to the shoulder 16' and spaced apart from the receiver 14 by approximately .020 inch. The air gaps 25 and 27 are .005 inch, and the closure disc 42 is fiberglass.

From the above description of the embodiment of applicants' invention as shown in FIG. 1, it is apparent that the receiver element 14 should ideally be maintained in an environment where, except for the upper surface 20c, it is surrounded by material having the same temperature. If this were attainable it would eliminate conductive, convective, and radiative heat transfer from the receiver 14 and thereby allow absolute precise measurement of the incident radiation flux. However, since physically this desideratum is not attainable, applicants' invention provides a close simulation to this ideal condition by establishing the rate of heat absorption and the rate of heat dissipation of the guard ring 16 close to the rate of heat absorption and dissipation of the receiver element 14, thus substantially maintaining thermal equilibrium therebetween.

FIG. 2 illustrates another embodiment of applicants' invention wherein the surroundings of an electromagnetic receiver element are closely controlled. A body member 12' is comprised of a receiver element 14, a guard ring 16, and a thin section flange means 18'. The upper surface 20' of the body member 12' has a surface finish that provides a high electromagnetic radiation absorptivity. Coupled to the flange means 18' and intermediate the receiver element 14 and the guard rings 16 are a plurality of baffle means 23, thereby providing comparatively small air gaps 22'. The mass of each of the baffles 23 is large in comparison with the mass of the flange means 18' and each baffle 23 thereby acts as a barrier to the conductive flow of heat through the flange means 18' from the receiver 14 to the guard rings 16. The temperature of each of the baffles 23 tends to remain close to the temperature of the receiver element 14, thereby minimizing radiative heat transfer therebetween, and the comparatively small air gaps 22' minimize convective heat transfer. Thus the plurality of baffles 23 aids in maintaining a proper temperature environment for the receiver element 14, and measurement of the temperature of the receiver element 14 provides an accurate measurement of the radiant energy flux caused by electromagnetic radiation 44.

While certain preferred embodiments of the invention have been specifically disclosed, it is understood that the invention is not limited thereto, as many variations will be readily apparent to those skilled in the art and it is intended that the foregoing description and the accompanying drawing be illustrative and limited only by the following claims.

What is claimed as new and is desired to be secured by Letters Patent of the United States is:

1. In combination: a unitary body member comprising an electromagnetic radiation receiving element having an upper surface for absorbing electromagnetic radiation, a lower surface and side surfaces, a guard ring enclosing said side surfaces of said receiver element and spaced apart therefrom having an upper surface for absorbing electromagnetic radiation and a lower surface, and a flange means for coupling said receiver element to said guard ring having an upper surface for absorbing electromagnetic radiation, said upper surface of said receiver element and said upper surface of said guard ring and said upper surface of said flange means being substantially coplanar; shield means for receiving electromagnetic radiation emitted from said rear surface of said receiver elements coupled to said rear surface of said guard ring and spaced apart from said rear surface of said receiver element and substantially parallel thereto and coextensive therewith, and having an upper surface facing said bottom surface of said receiver element for absorbing electromagnetic radiation and a bottom surface having an electromagnetic radiation absorptivity substantially lower than the upper surface thereof; thermally insulating support means coupled to said guard ring for supporting said body member; a thermocouple coupled to said rear surface of said receiver element for measuring the temperature thereof; and a closure disc coupled to said support means and spaced apart from said bottom surface of said shield means.

2. In combination: an electromagnetic radiation receiver element having an upper surface for absorbing electromagnetic radiation, side surfaces and a bottom surface; a guard ring surrounding said side surfaces of said receiver element and spaced apart therefrom having an upper surface for absorbing electromagnetic radiation and a bottom surface; a flange means having an upper surface for absorbing electromagnetic radiation and coupled to said receiver element and said guard ring for maintaining said spaced apart relationship; shield means coupled to said bottom surface of said guard ring and spaced apart from said bottom surface of said receiver element and substantially parallel thereto and coextensive therewith, said shield means having an electromagnetic radiation absorbing upper surface facing said bottom surface of said receiver element for absorbing electromagnetic radiation emitted therefrom and a bottom surface having an electromagnetic radiation absorptivity substantially less than said upper surface thereof; and a heat sensing member responsive to temperature changes of said receiver element coupled to said bottom surface of said receiver element for measuring the temperature thereof.

3. In combination: an electromagnetic radiation receiver element having an upper surface for absorbing electromagnetic radiation, side surfaces and a bottom surface, and a preselected thickness between said upper and said bottom surfaces; a guard ring surrounding said side surfaces of said receiver element and spaced apart therefrom and in close proximity thereto having an upper surface for absorbing electromagnetic radiation and a bottom surface; a flange means having an upper surface for absorbing electromagnetic radiation and coupled to said receiver element and said guard ring for maintaining said spaced apart relationship, and having a preselected thickness approximately 10% of said preselected thickness of said receiver element; shield means coupled to said bottom sur- face of said guard ring and spaced apart in close proximity to said bottom surface of said receiver element and substantially parallel thereto and coextensive therewith, said shield means having an electromagnetic radiation absorbing upper surface facing said bottom surface of said receiver element for absorbing electromagnetic radiation emitted therefrom and a bottom surface having an electromagnetic radiation absorptivity substantially less than said upper surface thereof; and a heat sensing member responsive to temperature changes of said receiver element coupled to said bottom surface of said receiver element for measuring the temperature thereof.

4. In combination: an electromagnetic radiation receiver element having an upper surface for absorbing electromagnetic radiation, side surfaces and a bottom surface, and a preselected thickness between said upper and said bottom surfaces; a guard ring surrounding said side surfaces of said receiver element and spaced apart therefrom and in close proximity thereto having an upper surface for absorbing electromagnetic radiation and a bottom surface; a flange means having an upper surface for absorbing electromagnetic radiation and coupled to said receiver element and said guard ring for maintaining said spaced apart relationship, and having a preselected thickness approximately 10% of said preselected thickness of said receiver element and said upper surfaces of said receiver element, said guard ring and said flange means being substantially coplanar; shield means coupled to said bottom surface of said guard ring and spaced apart in close proximity to said bottom surface of said receiver element and substantially parallel thereto and coextensive therewith, said shield means having an electromagnetic radiation absorbing upper surface facing said bottom surface of said receiver element for absorbing electromagnetic radiation emitted therefrom and a bottom surface having an electromagnetic radiation absorptivity substantially less than said upper surface thereof; and a heat sensing member responsive to temperature changes of said receiver element coupled to said bottom surface of said receiver element for measuring the temperature thereof.

5. In combination: an electromagnetic radiation receiver element having an upper surface for absorbing electromagnetic radiation, side surfaces and a bottom surface, and a preselected thickness between said upper and said bottom surfaces; a guard ring surrounding said side surfaces of said receiver element and spaced apart therefrom and in close proximity thereto having an upper surface for absorbing electromagnetic radiation and a bottom surface; a flange means having an upper surface for absorbing electromagnetic radiation and coupled to said receiver element and said guard ring for maintaining said spaced apart relationship, and having a preselected thickness approximately 10% of said preselected thickness of said receiver element and said upper surfaces of said receiver element, said guard ring and said flange means being substantially coplanar; shield means coupled to said bottom surface of said guard ring and spaced apart in close proximity to said bottom surface of said receiver element and substantially parallel thereto and coextensive therewith, said shield means having an electromagnetic radiation absorbing upper surface facing said bottom surface of said receiver element for absorbing electromagnetic radiation emitted therefrom and a bottom surface having an electromagnetic radiation absorptivity substantially less than said upper surface thereof; a heat sensing member responsive to temperature changes of said receiver element coupled to said bottom surface of said receiver element for measuring the temperature thereof; and means for thermally insulating said guard ring.

6. The arrangement defined in claim 4 wherein said receiver element, said guard ring and said flange means are a unitary construction.

7. The arrangement defined in claim 1 wherein said body member is stainless steel and said shield means is copper.

8. In combination: an electromagnetic radiation receiver element having an upper surface for absorbing electromagnetic radiation, side surfaces and a bottom surface; a guard ring surrounding said side surfaces of said receiver element and spaced apart therefrom having an upper surface for absorbing electromagnetic radiation and a bottom surface; a flange means having an upper surface for absorbing electromagnetic radiation and a bottom surface and coupled to said receiver element and said guard ring for maintaining said spaced apart relationship; at least one baffle means coupled to said bottom surface of said flange means and intermediate said guard ring and said receiver element; shield means coupled to said bottom surface of said guard ring and spaced apart from said baffle and from said bottom surface of said receiver element and substantially parallel thereto and coextensive therewith, said shield means having an electromagnetic radiation absorbing upper surface facing said bottom surface of said receiver element for absorbing electromagnetic radiation emitted therefrom and a bottom surface having an electromagnetic radiation absorptivity substantially less than said upper surface thereof; and a heat sensing member responsive to temperature changes of said receiver element coupled to said bottom surface of said receiver element for measuring the temperature thereof.

9. In combination: an electromagnetic radiation receiver element having an upper surface for absorbing electromagnetic radiation, side surfaces and a bottom surface, and a preselected thickness between said upper and said bottom surfaces; a guard ring surrounding said side surfaces of said receiver element and spaced apart therefrom and in close proximity thereto having an upper surface for absorbing electromagnetic radiation and a bottom surface; a flange means having an upper surface for absorbing electromagnetic radiation and a bottom surface and coupled to said receiver element and said guard ring for maintaining said spaced apart relationship, and having a preselected thickness approximately 10% of said preselected thickness of said receiver element; a plurality of baffle means coupled to said bottom surface of said flange means and intermediate said guard ring and said receiver element; shield means coupled to said bottom surface of said guard ring and spaced apart in close proximity to said bottom surface of said receiver element and substantially parallel thereto and coextensive therewith, said shield means having an electromagnetic radiation absorbing upper surface facing said bottom surface of said receiver element for absorbing electromagnetic radiation emitted therefrom and a bottom surface having an electromagnetic radiation absorptivity substantially less than said upper surface thereof; and a heat sensing member responsive to temperature changes of said receiver element coupled to said bottom surface of said receiver element for measuring the temperature thereof.

10. In combination: an electromagnetic radiation receiver element having an upper surface for absorbing electromagnetic radiation, side surfaces and a bottom surface, and a preselected thickness between said upper and said bottom surfaces; a guard ring surrounding said side surfaces of said receiver element and spaced apart therefrom and in close proximity thereto having an upper surface for absorbing electromagnetic radiation and a bottom surface; a flange means having an upper surface for absorbing electromagnetic radiation and a lower surface and coupled to said receiver element and said guard ring for maintaining said spaced apart relationship, and having a preselected thickness approximately 10% of said preselected thickness of said receiver element and said upper surfaces of said receiver element, said guard ring and said flange means being substantially coplanar; at least one baffle means coupled to said bottom surface of said flange means and intermediate said guard ring and said receiver element; shield means coupled to said bottom surface of said guard ring and spaced apart in close proximity to said bottom surface of said receiver element and substantially parallel thereto and coextensive therewith, said shield means having an electromagnetic radiation absorbing upper surface facing said bottom surface of said receiver element for absorbing electromagnetic radiation emitted therefrom and a bottom surface having an electromagnetic radiation absorptivity substantially less than said upper surface thereof; and a heat sensing member responsive to temperature changes of said receiver element coupled to said bottom surface of said receiver element for measuring the temperature thereof.

No references cited.